US012303859B2

(12) United States Patent
Sankar et al.

(10) Patent No.: US 12,303,859 B2
(45) Date of Patent: May 20, 2025

(54) MASS TRANSFER SWIRLER INCLUDING DISTRIBUTION MEMBER

(71) Applicant: SABIC Global Technologies B.V., Bergen op Zoom (NL)

(72) Inventors: Ashwin Ravi Sankar, Bangalore (IN); Deepak Sharma, Bangalore (IN)

(73) Assignee: SABIC Global Technologies B.V., Bergen op Zoom (NL)

( * ) Notice: Subject to any disclaimer, the term of this patent is extended or adjusted under 35 U.S.C. 154(b) by 497 days.

(21) Appl. No.: 17/637,588

(22) PCT Filed: Aug. 25, 2020

(86) PCT No.: PCT/IB2020/057938
§ 371 (c)(1),
(2) Date: Feb. 23, 2022

(87) PCT Pub. No.: WO2021/038441
PCT Pub. Date: Mar. 4, 2021

(65) Prior Publication Data
US 2022/0288554 A1    Sep. 15, 2022

Related U.S. Application Data

(60) Provisional application No. 62/892,174, filed on Aug. 27, 2019.

(51) Int. Cl.
*B01J 19/30* (2006.01)
*B01J 47/022* (2017.01)
*B01J 49/60* (2017.01)

(52) U.S. Cl.
CPC ............. *B01J 19/30* (2013.01); *B01J 47/022* (2013.01); *B01J 49/60* (2017.01);
(Continued)

(58) Field of Classification Search
CPC ................................ B01D 45/12; B01J 19/30
See application file for complete search history.

(56) References Cited

U.S. PATENT DOCUMENTS

| 3,208,833 | A | | 9/1965 | Carson |
| 3,611,679 | A | * | 10/1971 | Pall ........................ B01D 45/16 55/457 |

(Continued)

FOREIGN PATENT DOCUMENTS

| CA | 1330350 C | 6/1994 |
| CN | 1102358 A | 5/1995 |

(Continued)

OTHER PUBLICATIONS

Brooks, K. P. "Cesium Ion Exchange Using Actual Waste: Column Size Considerations." Battelle, Pacific Northwest National Laboratory, Richland, Washington, 1996, 40 pages.

(Continued)

*Primary Examiner* — Robert A Hopkins
(74) *Attorney, Agent, or Firm* — Norton Rose Fulbright US LLP

(57) ABSTRACT

A swirler includes a base and one or more fins coupled to the base. The swirler also includes a distribution member configured to divert or guide fluid. In some implementations, the distribution member includes an annular member coupled to the base and positioned at least partially around the longitudinal axis. The swirler may be included in an adsorption column.

20 Claims, 7 Drawing Sheets

(52) U.S. Cl.
CPC ............. *B01J 2219/30215* (2013.01); *B01J 2219/30223* (2013.01); *B01J 2219/30284* (2013.01); *B01J 2219/30408* (2013.01); *B01J 2219/30466* (2013.01)

(56) References Cited

U.S. PATENT DOCUMENTS

| | | | |
|---|---|---|---|
| 4,009,751 | A | 3/1977 | Zelnik |
| 4,208,284 | A | 6/1980 | Pretorius et al. |
| 4,450,082 | A | 5/1984 | Tanouchi et al. |
| 4,466,741 | A | 8/1984 | Kojima |
| 4,512,938 | A | 4/1985 | Jones et al. |
| 4,747,697 | A | 5/1988 | Kojima |
| 5,605,400 | A | 2/1997 | Kojima |
| 5,632,962 | A | 5/1997 | Baker et al. |
| 6,187,973 | B1 | 2/2001 | Husain |
| 7,014,175 | B2 | 3/2006 | Honnell |
| 7,390,408 | B2 | 6/2008 | Kearney et al. |
| 9,435,240 | B2 * | 9/2016 | Sampath ............ B01F 25/43151 |
| 2002/0063344 | A1 | 5/2002 | Pagade |
| 2002/0072643 | A1 | 6/2002 | Butler et al. |
| 2008/0089816 | A1 | 4/2008 | Siano et al. |
| 2014/0247687 | A1 | 9/2014 | Mizuno et al. |
| 2017/0189875 | A1 | 7/2017 | Von Deak et al. |

FOREIGN PATENT DOCUMENTS

| | | | |
|---|---|---|---|
| CN | 1438207 | A | 8/2003 |
| CN | 101848761 | A | 9/2010 |
| CN | 101959586 | A | 1/2011 |
| CN | 201799279 | U | 4/2011 |
| CN | 201855697 | U | 6/2011 |
| CN | 202893221 | U | 4/2013 |
| CN | 203392893 | U | 1/2014 |
| CN | 103816822 | A | 5/2014 |
| CN | 204147884 | U | 2/2015 |
| CN | 105771871 | A | 7/2016 |
| CN | 104941562 | B | 1/2017 |
| CN | 109268305 | A | 1/2019 |
| DE | 102016010501 | A1 | 3/2018 |
| EP | 0445203 | B1 | 10/1993 |
| EP | 3254754 | A1 | 12/2017 |
| HU | 912095 | | 12/1991 |
| HU | 210062 | B | 7/1995 |
| JP | S58122831 | A | 7/1983 |
| PL | 122418 | U1 | 3/2015 |
| RU | 87101 | U1 | 9/2009 |
| RU | 2630788 | C2 | 9/2017 |
| SU | 330875 | A | 8/1970 |
| TR | 201302903004 | S | 4/2013 |
| TW | M378779 | U | 4/2010 |
| WO | WO1995012451 | A1 | 5/1995 |
| WO | WO-2007129276 | A2 * | 11/2007 ............... B04C 3/00 |
| WO | WO2009106231 | A1 | 9/2009 |
| WO | WO2011102749 | A1 | 8/2011 |

OTHER PUBLICATIONS

Fahien et al. "Mass Transfer in Packed Beds," AIChE Journal. vol. 1, No. 1 (1955) 28-37.
International Search Report and Written Opinion from PCT/IB2020/057938 dated Oct. 12, 2020, 10 pages.
Maradiya et al. "The heat transfer enhancement techniques and their Thermal Performance Factor." Beni-Suef University Journal of Basic and Applied Sciences, vol. 7, Issue 1, Mar. 2018, pp. 1-21.
Schwartz et al. "Flow Distribution in Packed Beds." Industrial and Engineering Chemistry. vol. 45, No. 6, Jun. 1953, pp. 1209-1218.

* cited by examiner

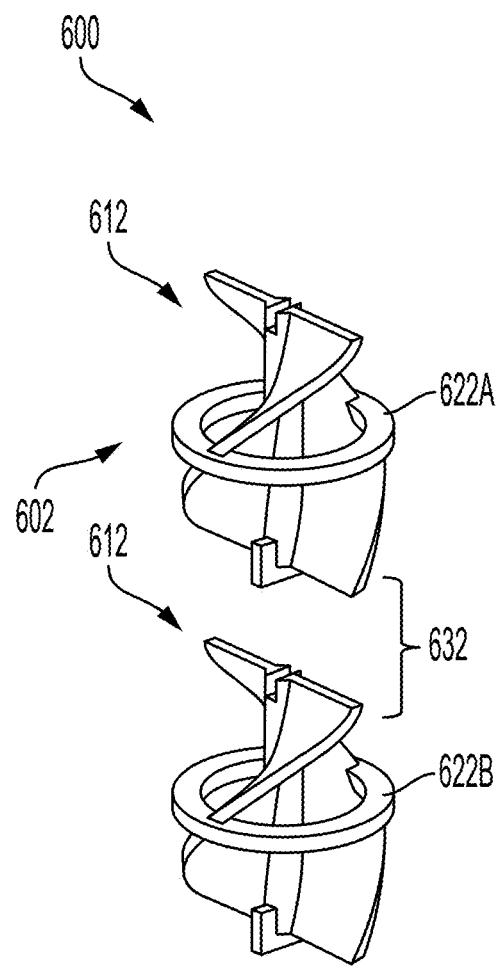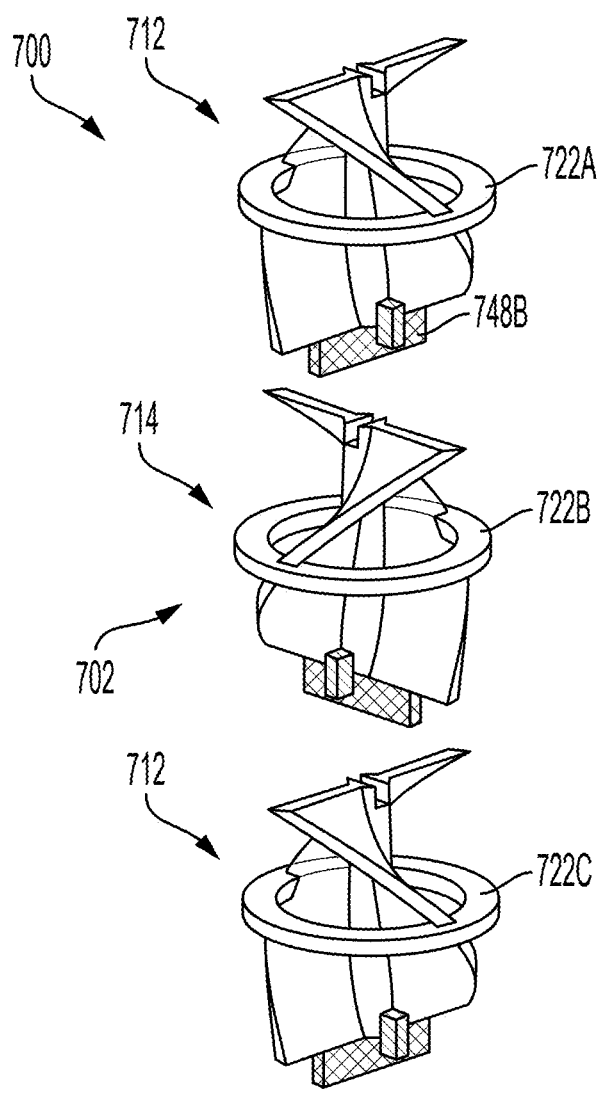
FIG. 6
FIG. 7

MASS TRANSFER SWIRLER INCLUDING DISTRIBUTION MEMBER

CROSS-REFERENCE TO RELATED APPLICATION

This application is a national phase application under 35 U.S.C. § 371 of International Application No. PCT/IB2020/057938 filed Aug. 25, 2020, which claims priority to U.S. Provisional Patent Application No. 62/892,174 filed Aug. 27, 2019. The entire contents of each of the above-referenced disclosures is specifically incorporated by reference herein without disclaimer.

FIELD OF INVENTION

The present disclosure relates generally to mass transfer swirlers and adsorption columns, and, but not by way of limitation, to adsorption columns for glycol production.

BACKGROUND

Adsorption columns are often utilized in industrial treatment plants (e.g., chemical, petrochemical, environmental, etc.) to pull impurities or unwanted content from a source material or fluid. Adsorption is the adhesions of atoms or molecules from one substance to the surface of another substance. An adsorption column typically includes a catalyst which initiates or causes adsorption of the desired chemical to a surface of the catalyst or a separate adsorbent material. Adsorption columns typically refer to such catalyst and/or adsorbent material as packing, and the packing is used to initiate or enhance the adsorption process. The packing may be loose and, in such cases, the packing may be positioned within a structure to hold the packing in place, which is often referred to as a "bed." Conventional packing employs complex geometrical shapes to increase flow and surfaces to increase mixing and mass transfer, which increases reaction rates.

Conventional adsorption processes, such as adsorption processes that employ adsorbents like activated carbon, ion exchange resins (cationic, anionic, aldehyde removal resins, etc.) are relatively slow mass transfer processes. Such processes utilize frequent regeneration of adsorbent (e.g., resin) due to faster breakthrough times leading to shorter cycle times and lower adsorbent (e.g., resin) utilization. Such processes also may use large quantities of regeneration solvents and generate large amounts of waste-water, which leads to challenges in terms of operating cost, sustainability, and complying with environmental regulations.

SUMMARY

The present disclosure describes swirlers, and methods, devices, and systems to relating thereto. The swirlers described herein correspond to mass transfer swirlers and include/encompass fins (e.g., helical fins) and distribution members that generate a vortex or vortices in fluid as it passes by the swirlers and that direct fluid axially and radially outward. Examples of such distribution members include annular members (e.g., rings), pipe distributers, mesh, striations, corrugations, etc. The swirlers described herein include adsorption column swirlers, i.e., swirlers for adsorption columns, or adsorption applications. Additionally, the swirlers may be used for other mass transfer and/or heat transfer applications. It was found through experimental analysis that designing an adsorption column with a swirler (i.e., a swirled adsorption column) or adding a swirler to a conventional adsorption column increases efficiency of mass transfer in the adsorption column, which increases adsorption of the adsorption column. The increased adsorption leads to an overall increase in efficiency of the adsorption column as evidenced by increased catalyst/resin utilization, increased breakthrough times, increased cycle times, reduced solvent use and regeneration, reduced waste, increased throughput, and lower operating costs.

In some implementations, the swirlers (e.g., an axially inflow swirler) described herein include a base, one or more fins coupled to the base, and an annular member positioned around or about at least a portion of the base and/or fins. The swirler may be positioned within a cavity of an adsorption column and receive influent (e.g., untreated fluid) in an axial direction of the adsorption column. As the influent passes through the fins (e.g., vanes) and the annular member of the swirler, the swirler generates a vortex, or vortices and directs the influent axially and radially outward, i.e., toward interior walls of the adsorption column. To illustrate, the swirler increases a rotation or vorticity of the influent, and the influent forms a vortex or vortices and the flow becomes turbulent or increases in turbulences (e.g., increase a Reynolds number of the influent flow). As described above, the rotational flow or increased rotational flow of the influent enables greater mass transfer and mixing of the influent and adsorbent material which increases adsorption efficiency. Swirlers described herein may include one or more additional features or elements to increase mass transfer and/or direct flow. For example, the swirler may include mesh positioned between the base and annular member. As another example, the swirler may include a pipe distributor in addition to or in the alternative of the annular member.

In some implementations, the adsorption column includes a stack of swirlers. The stack of swirlers may be connected or separate. Swirlers of the stack may additionally be offset from one another, i.e., fins thereof may be offset. Stacking and/or offsetting swirlers may further increase mass transfer and adsorption efficiency, as compared to a single swirler.

The swirlers described herein can be manufactured by additive or traditional manufacturing processes. In some implementations, a single swirler design can be modified or adapted for different applications (e.g., different size or type adsorption columns) without redesigning the swirler. For example, a single swirler design (e.g., a design file) can be modified, such as by scaling up or down, a size of the swirler for the particular application. Thus, swirled adsorption columns can be more efficiently designed and have reduced design costs and design times, as compared to conventional adsorption columns.

Thus, the present disclosure describes swirlers and adsorption columns with increased mass transfer efficiency and adsorption efficiency as compared to conventional swirlers and adsorption columns. Accordingly, the swirlers and adsorption columns have reduced operating costs and a system (e.g., chemical processing plant, water treatment plant, etc.) including such components may operate with increased efficiency as compared to conventional system with non-swirled adsorption columns. The present disclosure further describes methods and systems for retrofitting conventional-swirled adsorption columns with a swirler. Therefore, the swirlers, adsorption columns, methods, and systems described herein enable adsorption processed to be carried out more efficiently and with reduced costs as compared to conventional systems and methods. Accordingly, the present disclosure overcomes the identified challenges of increasing operating efficiency, particularly when using "High Selective Catalysts" (HSC).

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise.

The term "about" as used herein can allow for a degree of variability in a value or range, for example, within 10%, within 5%, or within 1% of a stated value or of a stated limit of a range, and includes the exact stated value or range. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Similarly, the phrase "A, B, C, or a combination thereof" or "A, B, C, or any combination thereof" includes: A alone, B alone, C alone, a combination of A and B, a combination of A and C, a combination of B and C, or a combination of A, B, and C.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range.

The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any implementation of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where".

Further, a device or system that is configured in a certain way is configured in at least that way, but it can also be configured in other ways than those specifically described. The feature or features of one implementation may be applied to other implementations, even though not described or illustrated, unless expressly prohibited by this disclosure or the nature of the implementations.

In the context of the present invention at least 20 embodiments are now described. Embodiment 1 is directed to a swirler. The swirler includes a base including a first end opposite a second end along a longitudinal axis of the base, the base including one or more fins oriented along the longitudinal axis from the first end to the second end; and an annular member coupled to the base and positioned at least partially around the longitudinal axis. Embodiment 2 is the swirler of embodiment 1, wherein the base, fins or both, include plastic or metal. Embodiment 3 is the swirler of any of embodiments 1 and 2, further including mesh coupled to the base, the annular member or both, wherein the mesh is positioned within a gap defined by the base and the annular member. Embodiment 4 is the swirler of any of embodiments 1 to 3, wherein a degree of twist with respect to a longitudinal axis of the base is between 15 to 70 degrees. Embodiment 5 is the swirler of any of embodiments 1 to 4, wherein the annular member is positioned around an entirety of the base and is configured to function as a distributor and generate divergent flow which moves fluid radially outward from the base. Embodiment 6 is the swirler of any of embodiments 1 to 5, wherein the annular member includes striations or has a corrugated surface. Embodiment 7 is the swirler of any of embodiments 1 to 6, further including one or more interconnects configured to couple to one or more other swirlers. Embodiment 8 is the swirler of any of embodiments 1 to 7, wherein the base includes a hub, and wherein the one or more fins includes two helical fins coupled to the hub, the two helical fins each having a rectangular cross section and a pitch of 150-210 degrees about the longitudinal axis. Embodiment 9 is directed to a system. The system includes a cylindrical tube; a distributor coupled to the cylindrical tube configured to provide fluid to the cylindrical tube; a catalyst positioned in the cylindrical tube; a plurality of swirlers positioned in the cylindrical tube, wherein the plurality swirlers are configured to increase a vorticity of the fluid in the cylindrical tube and to direct the fluid to interior walls of the cylindrical tube to enable adsorption of a reactant in the fluid by the catalyst to generate treated fluid; and an outlet configured to provide the treated fluid from the cylindrical tube. Embodiment 10 is the system of embodiment 9, wherein the system includes an adsorption column including the cylindrical tube, the distributor, the catalyst, and the plurality of swirlers, wherein the catalyst includes resins, adsorbent beds, packed particles, coated particles, or a combination thereof, and wherein the plurality of swirlers include an annular member, a distribution plate, or a pipe distributor. Embodiment 11 is the system of embodiment 10, further including a second adsorption column, the second adsorption column different from the adsorption column and including a second inlet coupled to an outlet of the adsorption column. Embodiment 12 is the system of embodiment 9, wherein the system includes a deionizing unit, and wherein the catalyst includes an ion exchange resin. Embodiment 13 is the system of embodiment 9, wherein the system includes an aldehyde removal unit, and wherein the catalyst includes activated carbon. Embodiment 14 is the system of any of embodiments 9 to 13, wherein each swirler of the plurality of swirlers includes a first coupling configuration at a first end of the swirler; and a second coupling configuration at a second end of the swirler, wherein a particular first coupling configuration of a first swirler of the plurality of swirlers is configured to mate with a second particular coupling configuration of a second swirler of the plurality of swirlers.

Embodiment 15 is the system of any of embodiments 9 to 14, further including a collector coupled to the cylindrical tube and configured to receive treated fluid from the cylindrical tube; a bed positioned in the cylindrical tube and including the plurality of swirlers; and one or more reembodiment compressors coupled to the cylindrical tube. Embodiment 16 is a method of operating an adsorption column. The method includes the steps of receiving, by an inlet, an untreated fluid into an adsorption column; swirling, by one or more swirlers positioned within the adsorption column, the untreated fluid in the adsorption column to mix the untreated fluid with a catalyst of the adsorption column; adsorbing, by the catalyst, a reactant of the untreated fluid to generate a treated fluid; and providing the treated fluid via an outlet of the adsorption column. Embodiment 17 is the method of embodiment 16, wherein the treated fluid includes partially treated fluid, and further including providing the treated fluid to a second inlet of a second adsorption column, the second adsorption column configured to generate a second treated fluid. Embodiment 18 is the method of any of embodiments 16 and 17, wherein the reactant contains impurities in the untreated fluid, and further includes the step of regenerating the catalyst, wherein regenerating the catalyst includes the steps of cease providing the untreated fluid to the inlet; providing a solvent configured to remove absorbed impurities from the catalyst to regenerate the catalyst; flushing the removed impurities from adsorption column; and initiate providing the untreated fluid to the inlet. Embodiment 19 is the method of any of embodiments 16 to 18, further including rotating, by a motor coupled to the one or more swirlers, the one or more swirlers. Embodiment 20 is the method any of embodiments 16-19, wherein swirling the untreated fluid causes the untreated fluid to generate localized vortices resulting in increased turbulence, and wherein the increased turbulence increases mixing of the untreated fluid and the catalyst.

Some details associated with the implementations are described above, and others are described below. Other implementations, advantages, and features of the present disclosure will become apparent after review of the entire application, including the following sections: Brief Description of the Drawings, Detailed Description, and the Claims.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the implementation depicted in the figures. Views identified as schematics are not drawn to scale.

FIG. 6 is an exploded isometric view of an example configuration of a stack of swirlers.

FIG. 7 is an exploded isometric view of another example configuration of a stack of swirlers.

DETAILED DESCRIPTION OF ILLUSTRATIVE IMPLEMENTATIONS

Figure 1:
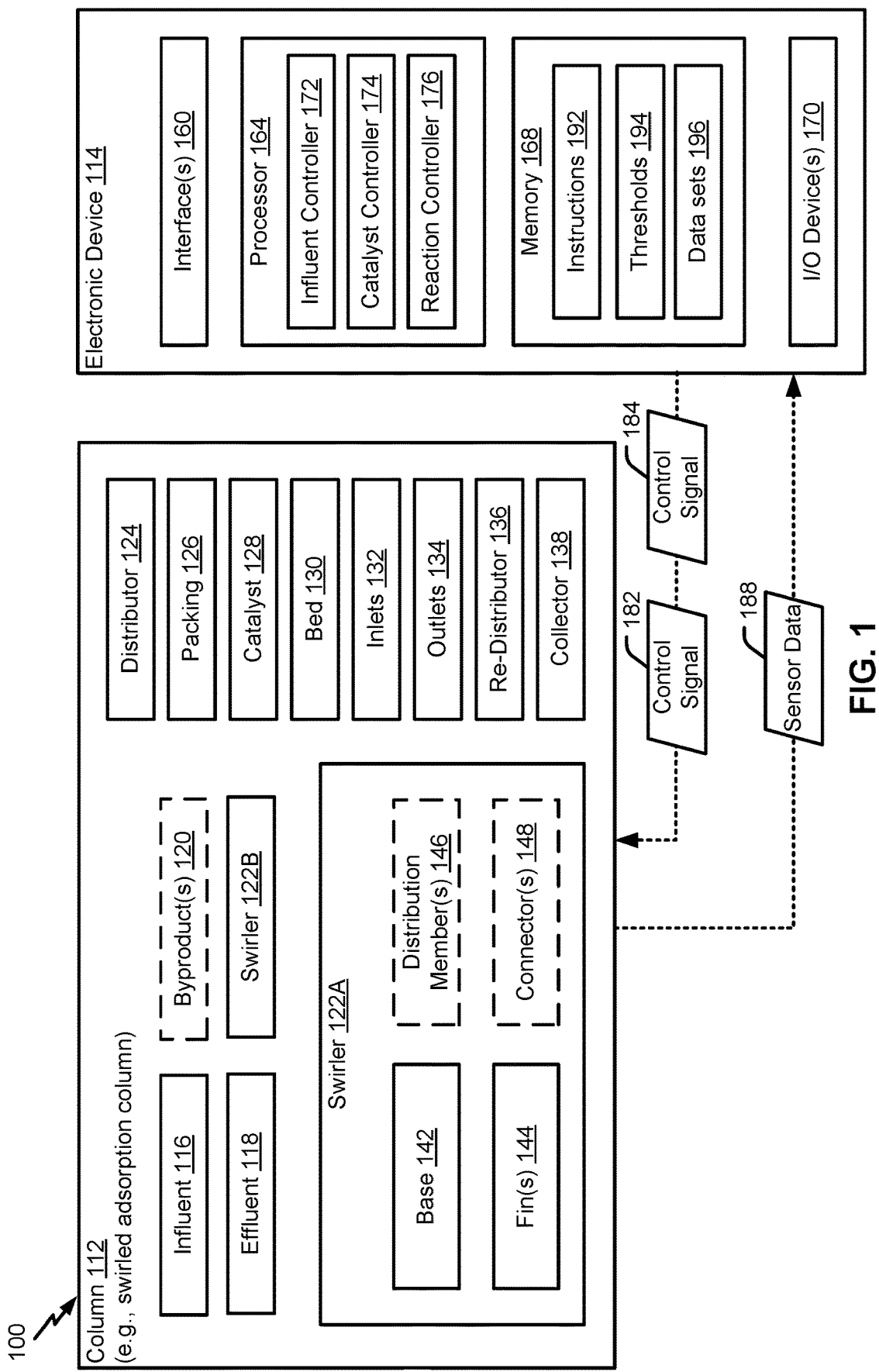
FIG. 1 is a block diagram of an example of a system for adsorption.

Referring to FIG. 1, FIG. 1 shows a block diagram of a system 100 for treating a source material by adsorption. System 100 includes one or more adsorption columns, illustrated by representative adsorption column (e.g., column 112), and an electronic device 114. System 100 may include or correspond to a de-ionizer system, as an illustrative, non-limiting example.

Column 112 may include or correspond to a swirled adsorption column and may be configured to cause adsorption by swirling source material, such as untreated fluid or process fluid referred to as influent 116, to increase mass transfer and produce treated fluid, referred to as effluent 118. Influent 116 may be untreated or partially treated fluid and effluent 118 may be partially treated fluid or fully treated fluid. Column 112 may include or correspond to a flanged column (i.e., multiple cylindrical sections coupled together) or a welded column (i.e., a monolithic pressure vessel). Column 112 includes one or more swirlers 122, one or more inlets 132, and one or more outlets 134. Additionally, column 112 may optionally include one or more of a distributor 124, packing 126, a catalyst 128 (e.g., catalyst material), and a bed 130. Furthermore, column 112 may further include a re-distributor 136 and/or a collector 138 in some implementations.

Swirlers 122 may include mass flow or mass transfer type swirlers. Swirlers 122 may be configured to receive fluid axially, i.e., along a length of base 142, or radially, from a circumference or sides of base 142 and to rotate within column 112 to increase mass transfer and vorticity. As illustrated in FIG. 1, swirlers 122 include a first swirler 122A and a second swirler 122B. In FIG. 1, first swirler 122A includes or corresponds to an axial flow swirler and includes base 142, a fin 144 (e.g., one or more fins) and at least one distribution member 146. Base 142 (e.g., fan base or hub) is a positioned in a center of swirler 122A and the fin 144 is attached to the base 142. Base 142 may include a through hole or may be solid. In a particular implementation, base 142 comprises an elongated cylindrical member. Swirlers 122 (e.g., base 142, fin 144, or both) may comprise plastic or metal. Swirlers 122 may be manufactured by additive manufacturing (e.g., 3D printed) or by traditional manufacturing techniques, such as casting, forging, and/or machining. As an illustrative, non-limiting example, swirlers 122 include Acrylonitrile butadiene styrene (ABS).

Fin 144 is configured to swirl contents of column 112. For example, fin 144 is configured to swirl influent 116 within column 112. Fin 144 includes or corresponds to helical fins, axial fins, or circumferential finals. Helical fins and axial fins correspond to fixed vanes arranged axially relative to base 142. Fin 144 is configured to increase a rotational within column 112, e.g., increase a vorticity of the flow and/or generate vortices.

Swirler 122 includes at least one distribution member 146. A distribution member 146 is configured to distribute flow of fluid, influent 116, as the fluid pass through or by swirler 122. For example, the distribution member 146 may be configured to direct the flow of fluid axially and radially outward. Distribution member 146 may be coupled to the base 142, to fin 144, or to a combination thereof, and/or may be incorporated into the base 142, to fin 144, or to a combination thereof. Exemplary distribution members 146 include annular or ring members, distribution plates, pipe distributors, meshing, surface features (e.g., striations, corrugations, etc.), another device to direct flow, or a combination thereof. As an illustrative example, distribution member 146 includes one or more annular/ring members. The one or more annular/ring members be arranged circumferentially around base 142 and are configured to distribute the flow of the column 112 outward, i.e., away from the base 142 and towards walls of the column 112. One or more ring members may be coupled to the base 142, to fin 144, or to a combination thereof.

In some implementations, one or more swirlers 122 of the column 112 include one or more connectors 148. One or more connectors 148 include or correspond to interconnects which are configured to couple one or more swirlers 122 of column 112 together. One or more connectors 148 may include or correspond to various connector or mating components. As illustrative, non-limiting examples, the one or more connectors 148 may include hooks, eyes, notches, recesses, male connectors, female connectors, threads, etc. In some implementations, column 112 includes a stack of swirlers 122. The stack of swirlers 122 may include or correspond to a stack of "loose" swirlers 122 which are not coupled and free to rotate independent of one another in column 112. In other implementations, one or more swirlers 122 of the stack of swirlers 122 of column 112 are coupled or connected, such as by connectors 148, and one or more swirlers 122 of the stack of swirlers 122 rotate in conjunction with one another within one or more swirlers 122 of the stack of swirlers 122. In a particular implementation, the stack of swirlers is a unitary or monolithic swirler, with multiple discreet swirlers 122 or swirler sections. The swirlers of the unitary stack may be arranged in line with one another of offset from one another. To illustrate, the fins of the swirlers of the stack may be aligned in the axial direction or may be offset from one another in the axial direction. Each swirler of the stack may include its own fins and/or ring members and have a shared or common base. Examples of stacks (602, 702) of swirlers 122 are described further with reference to FIGS. 6 and 7.

Distributor 124 is configured to regulate a flow of fluid (e.g., liquid or gas) into and/or through column 112. For example, distributor 124 may be positioned in a top portion of column 112 and configured to regulate fluid pressure and flow within column 112. Alternatively, distributor 124 may be positioned in a bottom portion of column 112 and configured to regulate gas pressure (e.g., lighter than air gas) and flow within column 112. In some implementations, distributor 124 is deigned to separate gases and liquids. Distributor 124 may include or correspond to a pipe distributor, a channel type distributor, a splash plate type distributor, a spray nozzle distributor, sidewall orifice distributor, an extraction distributor, a radial distributor, or a combination thereof.

Packing 126 includes or corresponds material inserted or positioned within column 112, such as bed 130 thereof, which provides additional surface area for mass transfer. Packing 126 may be configured to direct flow, increase a surface area within column 112, control flow (e.g., speed of the flow), etc. Packing 126 may include or correspond to a loose or filler material inserted into column 112 or packing 126 may include or correspond to a packing structure, (e.g., porous foam material) which provides channel or pathways with surfaces to initiate adsorption. In particular implementation, packing 126 may include a catalyst or function as a catalyst (i.e., function as and be combined with catalyst 128). Such packing is often referred to a random packing or structured packing. To illustrate, the material of the packing 126 may include or correspond to catalyst 128 (e.g., include or be coated in catalyst material). In other implementations, the column 112 includes catalyst 128 (e.g., catalyst material) separate from packing 126.

Catalyst 128 includes or corresponds to a chemical or material configured to initiate adsorption of a particular atom or molecule. Examples of catalysts 128 include, charcoal (e.g., activated charcoal), resins, ion exchange material, etc. In a particular implementation, catalyst 128 is included in or impregnated on one or more swirlers 122 of column 112. In other implementations, catalyst 128 is injected or introduced into adsorption during operation and/or inserted in column 112 prior to operation. As described above, in still other implementations, catalyst 128 is included in or impregnated on packing 126. In some implementations, catalyst 128 may be replaced, cleaned (e.g., regenerated), and/or purged to increase an efficiency of catalyst 128.

The packing 126 and/or catalyst 128 may include or corresponds to adsorbent material, i.e., material that adsorbs atoms or molecules of influent 116. To illustrate, atoms or molecules of influent 116 (reactants of influent 116) adhere to a surface of the adsorbent material and may be referred to as byproducts 120. The adsorbent material may include or correspond to oxygen-containing compounds, carbon-base compound, and/or polymer based compounds. Oxygen-containing compounds are often hydrophilic and polar, including materials such as silica gel and zeolites. Carbon-based compounds are often hydrophobic and non-polar, including materials such as activated carbon (e.g., charcoal) and graphite. Polymer-based compounds may be polar or non-polar functional groups in a porous polymer matrix.

Bed 130 may be configured to regulate a flow of fluid through an adsorption section column 112. For example, bed 130 may be positioned in a central portion column 112 and configured to regulate mixing of influent 116 and packing 126 and/or catalyst 128. In a particular implementation, bed 130 includes or corresponds to support structure configured to hold or support swirlers 122, packing 126, catalyst 128, or a combination thereof.

Inlets 132 may include or correspond to axial inlets, circumferential inlets, radial inlets, or tangential inlets. Tangential inlets include conduit or ducts that are arranged tangentially to base 142 (e.g., a circular cross-section thereof). Tangential inlets are configured to provide oxidizer with rotational flow to base 142. Inlets 132 may include or corresponds to pipe inlets, vane inlets, splash plate inlets, etc. Inlets 132 may include inlets for gas and/or liquid. As an illustrative non-limiting example, inlets 132 include a first inlets for influent 116 and a second inlet for catalyst 128.

Outlets 134 may include or correspond to axial outlets, circumferential outlets, radial outlets, or tangential outlets. Tangential outlets include conduit or ducts that are arranged tangentially to base 142 (e.g., a circular cross-section thereof). Tangential outlets are configured to provide fluid with rotational flow to base 142. Outlets 134 may include or corresponds to pipe inlets, vane inlets, splash plate inlets, etc. Inlets 132 may include inlets for gas and/or liquid. As an illustrative non-limiting example, inlets 132 include a first inlets for influent 116 and a second inlet for catalyst 128.

Re-distributor 136 is configured to mix (e.g., remix) the influent 116 in a liquid phase so as to bring the liquid flow onto a next (e.g., lower) section or bed at a more uniform composition. Collector 138 is configured to accumulate liquid and or gas for distribution (e.g., redistribution). Collector 138 may be configured to cause condensation of a gas and/or collect and store liquid for redistribution. Collector 138 may be coupled to distributor 124, re-distributor 136, or both. Collector 138 may include or correspond to a vane type collector, a grid collector, a support grid collector, a chimney tray collector, random packing support grid, random packing retaining grid, etc.

Additionally, system 100 may include one or more other components, such as midstream components, downstream components, etc. As illustrative examples, system 100 may further include one or more reclaim compressor and/or separators, such a gas-liquid separators, liquid-liquid separators, or a combination thereof.

Column 112 may include or be segmented into one or more discrete sections. For example, column 112 may include a distribution section, an adsorption section, a collection section, etc. Additionally, column 112 may include multiple instances of a particular section. For example, column 112 may include multiple adsorption section, such as multiple instances of swirlers and/or catalysts. Column 112 may include one or more other sections, such as heat capture sections, gas generation sections, recirculation sections, regeneration sections, etc.

Electronic device 114 includes one or more interfaces 160, one or more processors (e.g., one or more controllers), such as a representative processor 164, a memory 168, and one or more input/output (I/O) devices 170. Interfaces 160 may include a network interface and/or a device interface configured to be communicatively coupled to one or more other devices, such as column 112 and components thereof. For example, interfaces 160 may include a transmitter, a receiver, or a combination thereof (e.g., a transceiver), and may enable wired communication, wireless communication, or a combination thereof. Although electronic device 114 is described as a single electronic device, in other implementations system 100 includes multiple electronic devices. In such implementations, such as a distributed control system, the multiple electronic devices each control a sub-system or a component of column 112, such as a swirler 122, an inlet 132, an outlet 134 (e.g., valve thereof), etc.

Processor 164 includes a influent controller 172, a catalyst controller 174, and a reaction controller 176. For example, influent controller 172 (e.g., processor 164) may be configured to generate and/or communicate one or more influent control signals to column 112, swirlers 122, or a combination thereof influent controller 172 is configured to control (or regulate) an environment, such as an air quality, temperature, and/or pressure, within swirlers 122 (e.g., a chamber or mixing area thereof) and/or delivery/injection of influent 116 into swirlers 122. For example, influent controller 172 may be configured to generate and/or communicate one or more environmental control signals 182 to swirlers 122, one or more ingredient control signals 184 to inlet 132, swirlers 122, or a combination thereof.

Catalyst controller 174 is configured to control (or regulate) an environment, such as a temperature (e.g., heat) and/or pressure, within bed 130 of column 112) and/or delivery/injection of packing 126 and/or catalyst 128 into swirlers 122 (e.g., mixing or adsorption area thereof). For example, catalyst controller 174 may be configured to generate and/or communicate one or more environment control signals 182 to swirlers 122, one or more ingredient control signals 184 to swirlers 122, or a combination thereof.

Reaction controller 176 is configured to control (or regulate) an environment, such as a temperature (e.g., heat) and/or pressure, within column 112 (e.g., one or more section or portions thereof, such as a reaction area and/or adsorption thereof) and/or delivery/injection of materials into column 112 (e.g., a reaction area and/or adsorption thereof). For example, reaction controller 176 may be configured to generate and/or communicate one or more environment control signals 182 to column 112, one or more ingredient control signals 184 to column 112, or a combination thereof. Column 112 (e.g., sections or components thereof) can include one or more corresponding sensors (not shown) configured to generate sensor data, such as sensor data 188. The sensor data 188 can indicate conditions such as temperature, pressure, time, viscosity, etc.

Although one or more components of processor 164 are described as being separate components, at in some implementations, one or more components of the processor 164 may be combined into a single component. For example, although catalyst controller 174 and reaction controller 176 are described as being separate, in other implementations, catalyst controller 174 and reaction controller 176 may be incorporated into a single controller. Additionally, or alternatively, one or more components of processor 164 may be separate from (e.g., not included in) processor 164. To illustrate, influent controller 172 may be separate and distinct from processor 164. In other implementations, processor 164 includes additional controllers, such as a quenching controller, a damper controller, etc.

Memory 168, such as a non-transitory computer-readable storage medium, may include volatile memory devices (e.g., random access memory (RAM) devices), nonvolatile memory devices (e.g., read-only memory (ROM) devices, programmable read-only memory, and flash memory), or both. Memory 168 may be configured to store instructions 192, one or more thresholds 194, and one or more data sets 196. Instructions 192 (e.g., control logic) may be configured to, when executed by the one or more processors 164, cause the processor(s) 164 to perform operations as described further here. For example, the one or more processors 164 may perform operations as described with reference to FIG. 8. The one or more thresholds 194 and one or more data sets 196 may be configured to cause the processor(s) 164 to generate control signals. For example, the processors 164 may generate and send control signals responsive to receiving sensor data, such as sensor data 188 from column 112. The temperature or ingredient flow rate can be adjusted based on comparing sensor data 188 to one or more thresholds 194, one or more data sets 196, or a combination thereof.

In some implementations, processor 164 may include or correspond to a microcontroller/microprocessor, a central processing unit (CPU), a field-programmable gate array (FPGA) device, an application-specific integrated circuits (ASIC), another hardware device, a firmware device, or any combination thereof. Processor 164 may be configured to execute instructions 192 to initiate or perform one or more operations described with reference to FIGS. 1, 2, 3A-3F, 4A-4G, 6, and 7 and/or one more operations of the methods of FIG. 8.

The one or more I/O devices 170 may include a mouse, a keyboard, a display device, the camera, other I/O devices, or a combination thereof. In some implementations, the processor(s) 164 generate and send control signals responsive to receiving one or more user inputs via the one or more I/O devices 170.

Electronic device 114 may include or correspond a communications device, a mobile phone, a cellular phone, a satellite phone, a computer, a tablet, a portable computer, a display device, a media player, a desktop computer, or a server. Additionally, or alternatively, the electronic device 114 may include a set top box, an entertainment unit, a personal digital assistant (PDA), a monitor, a computer monitor, a television, a tuner, a video player, any other device that includes a processor or that stores or retrieves data or computer instructions, or a combination thereof.

During operation of system 100, the one or more swirlers 122 mix influent 116, and optionally catalyst 128, to initiate an adsorption reaction. Specifically, the one or more swirlers 122 rotate influent 116 to enable mass transfer between influent 116 and packing 126 and/or catalyst 128. A more detailed operation of the swirlers 122, and the various configurations thereof, are described further herein with reference to FIGS. 2, 3A-3F, 4A-4G, and 5-7. Reactants (impurities, contaminants, undesired chemicals, etc.) of the influent 116 adhere to the packing 126 and/or catalyst 128, and treated influent 116, or effluent 118, is generated. The effluent 118 exits out the column 112, such as via outlet 134.

The above is a simplified operation of column 112 of system 100. Column 112 may have recirculation systems, re-distributors, collectors, packing supports, etc. to increase efficiency or process a particular input compound. Additionally, system 100 may have additional adsorption columns (similar to or different from the illustrated column 112), recirculation systems, heat exchangers, etc. to increase efficiency or process a particular influent (e.g., particular process fluid).

In some implementations, the operation, such as parameters thereof, are controlled by electronic device 114. For example, the electronic device 114 may receive sensor data 188 from sensors of system 100 and/or column 112. To illustrate, the electronic device 114 may receive temperature data from temperature sensors associated with the swirlers 116 or another component of column 112. Additionally, or alternatively, the electronic device 114 receives pressure data, chemical composition data, or a combination thereof from pressure and/or chemical sensors.

For example, column 112 adjusts an intake device or system (e.g., distributor 124, re-distributor 136, and/or inlet 132, such as valve thereof) responsive to control signals 182, 184 from the influent controller 172. To illustrate, influent controller 172 may send one or more environment control signals 182 to distributor 124 and/or a valve of or associated with inlet 132 to adjust conditions (e.g., temperature, pressure, etc.) of the influent 116 provided to the swirlers 122. Additionally, or alternatively, influent controller 172 may send one or more ingredient control signals 184 (e.g., influent delivery control signals) to distributor 124 and/or a valve of or associated with inlet 132 to adjust a rate and/or or an amount of the influent 116.

Catalyst controller 174 may further send or more control signals to control delivery of catalyst 128 to swirlers 122. To illustrate, fuel controller 174 sends an ingredient control signal 184 to adjust a mass flow rate, a pressure, a temperature, etc., or a combination thereof of the catalyst 128. After influent 116 and/or catalyst 128 are provided, the influent 116 and catalyst 128 mixes and reactants of influent 116 adsorb onto catalyst 128 or another adsorbent material.

Reaction controller 176 may send or more control signals to control reaction of influent 116 and catalyst 128 and/or mixing of swirlers 122. To illustrate, reaction controller 176 sends an environmental control signal 182 to control conditions of the column 112, such as temperature and pressure of contents and/or components of column 112 a rotation speed of swirlers 122, etc. In a particular implementation, reaction controller 176 adjusts a rotation speed of swirlers 122 to adjust absorption.

After adsorption or catalyst 128 (e.g., resin) utilization, the catalyst 128 may be regenerated by adding solvents and capturing byproducts 120 released from catalyst 128 (or adsorbent material).

Reaction controller 176 may further send one or more control signals to control purging of used catalyst 128, regeneration of used catalyst 128, recycling of used catalyst 128, or a combination thereof. To illustrate, reaction controller 176 may send or more control signals to control delivery (e.g., injection) of solvent, e.g., chemical configured to clean catalyst 128 or remove adsorbed atoms and molecules from catalyst 128 or adsorbent material.

Reaction controller 176 may further send one or more control signals to control delivery of treated fluid, effluent 118. To illustrate, reaction controller 176 may send or more control signals to control delivery (e.g., disposal and/or separation) of byproducts 120, treated effluent 118, or both, from column 112.

In some implementations, a swirler is free to rotate within column 112 during operation. For example, swirler 122A may rotate passively responsive to force imparted by fluid (influent 116) flowing past swirler 122A. As another example, swirler 122A may be actively rotated by a motor to impart rotational flow in the oxidizer. To illustrate, swirler 122A is coupled to a motor and the motor rotates the swirler 122A within the column 112 during operation. In other implementations, swirler 122A is stationary, i.e., fixedly coupled to the column 112 or a component thereof such that, during operation, fin 144 has a fixed or stationary position relative to the column 112.

Accordingly, the present disclosure overcomes the identified challenges of operating adsorption columns at high efficiency. Additionally, the present disclosure increases efficiency and reduces costs for operating adsorption columns.

Figure 2:
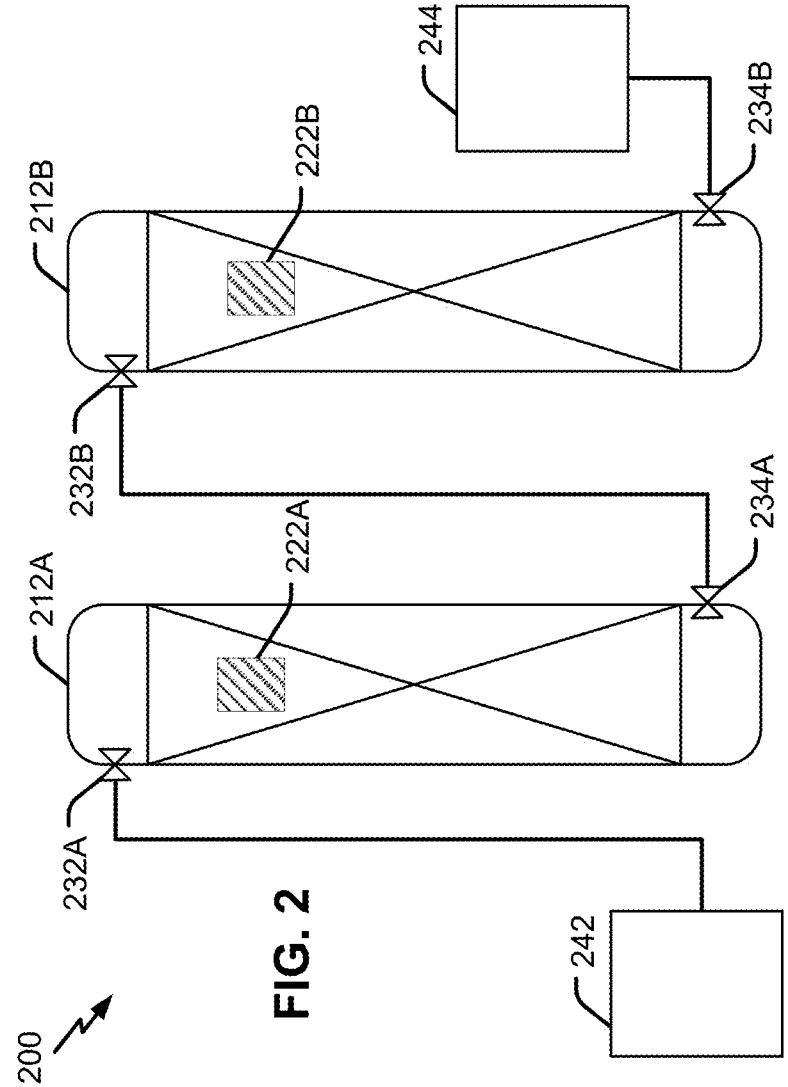
FIG. 2 is a schematic view of an example of a system including multiple adsorption columns in series.

Referring to FIG. 2, a diagram illustrates a schematic view of a system 200 including multiple adsorption columns. In FIG. 2, system 200 includes two adsorption columns, 212A and 212B, coupled in series. To illustrate, an outlet 234A of a first adsorption column 212A for treated fluid (e.g., partially treated fluid or treated fluid with respect to a particular impurity or contaminant) is coupled to an inlet 232B of a second adsorption column 212B. The adsorption columns (e.g., 212A, 212B) of system 200 may be the same or different from one another. For example, for a deionizing system or unit, the adsorption columns 212A and 212B may be different and include different catalysts (e.g., 128) and/or packing (e.g., 126), such as different ion exchange resins. To illustrate, the first adsorption column 212A may include anion resins and the second adsorption column 212B may include cation resins. The adsorption columns 212A and/or 212B may include or correspond to column 112 and may include one or more swirlers, such as swirlers 222. Swirlers 222 may include or correspond to swirler 122A or 122B of FIG. 1.

During operation, influent from a first reservoir 242 is provided (e.g., pumped, such as by a peristatic pump) to first adsorption column 212A via first inlet 232A. First adsorption column 212A treats the influent, partially treats the influent, using first swirler 222A and provides the treated (or partially treated) fluid as effluent via first outlet 234A to second inlet 232B of second adsorption column 212B. Second adsorption column 212B treats the influent, partially treats the influent, using second swirler 222B and provides the treated (or partially treated) fluid as effluent via a second outlet 234B to second reservoir 244. Accordingly, system 200 may include multiple adsorption columns, such as one or more swirled adsorption columns.

Figure 3C:
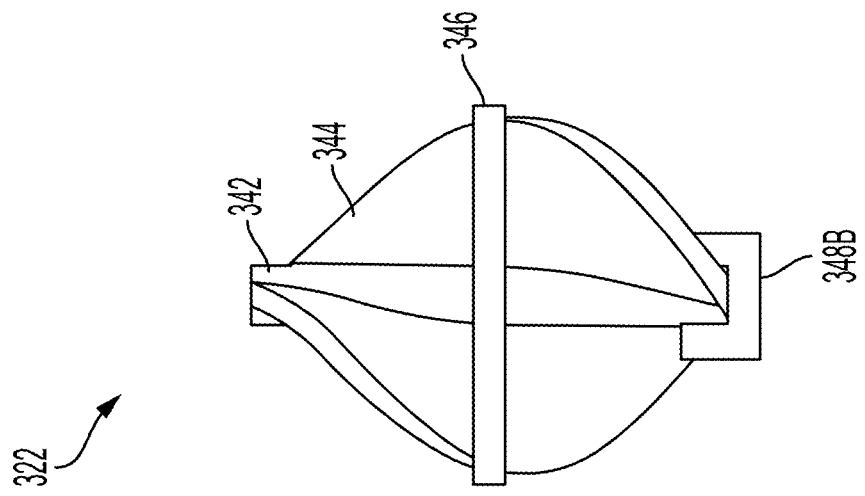
FIGS. 3A, 3B, and 3C each illustrate a view of an example configuration of a swirler.
Figure 3B:
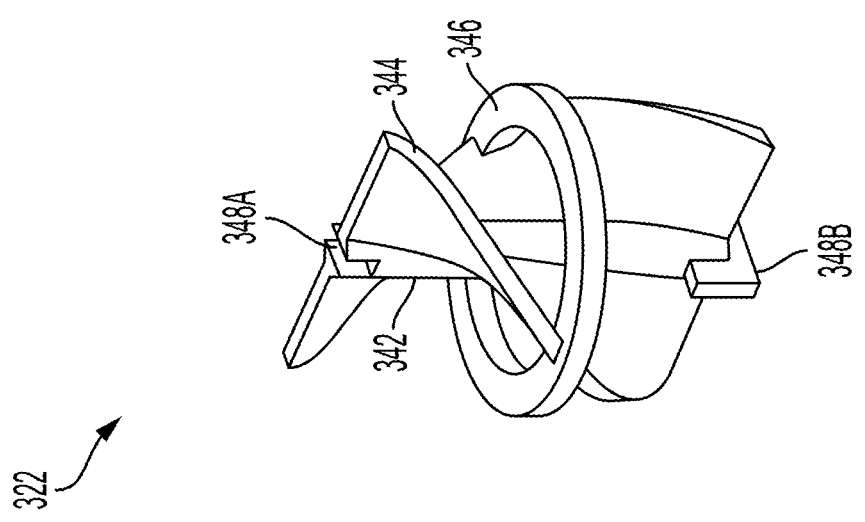
Figure 3A:
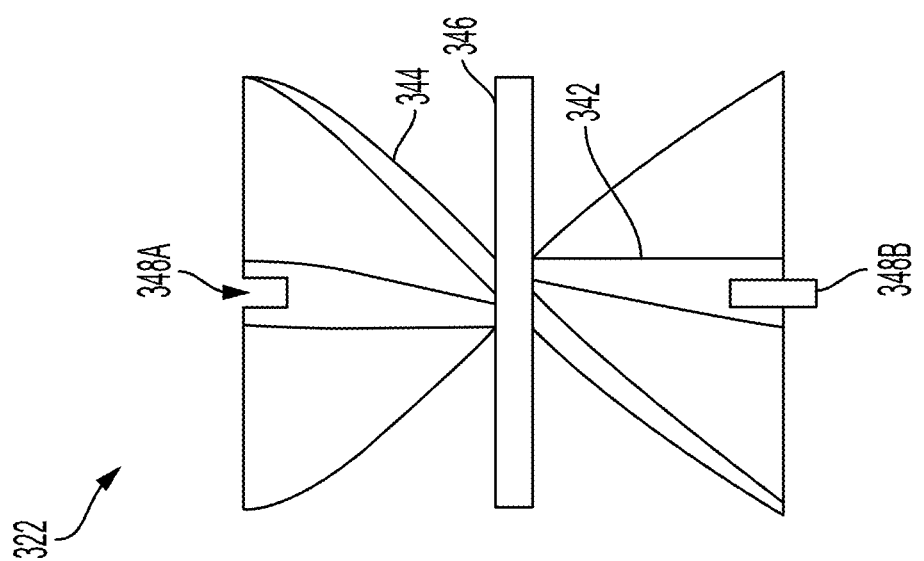

Referring to FIGS. 3A, 3B, and 3C, views of an example configurations of a swirler are illustrated, such as swirler 122 (e.g., 122A, 122B, or both) of FIG. 1 or swirler 222 (e.g., 222A, 222B, or both) of FIG. 2. Referring to FIG. 3A, a side view of example configuration of a swirler 322 including two axially arranged fins 344 and a single annular member 346 is illustrated. In the example of FIG. 3A, the axially arranged fins 344 (e.g., helical fins) are configured to rotate fluid to impart a clockwise rotation or clockwise vortex.

In the example shown in FIG. 3A, the swirler 322 has two fins 344 (aka vanes) emanating from a central tube structure, hub 342. Hub 342 may include or correspond to base 142. The hub 342 is oriented lengthwise along an axial direction of the adsorption column, as illustrated in FIG. 2. As illustrated in FIG. 3A, the plurality of fins 344 are symmetrical, i.e., each of the fins 344 of the plurality of fins has the same shape and are spaced equally in the radial direction around the swirler 322.

Referring to FIG. 3B, a isometric (perspective) view of example configuration of swirler 322 is illustrated. As illustrated in FIG. 3B, the annular member 346 is coupled to the fins 344 and is arranged about an entirety of the swirler 322, such as hub 342 thereof. Annular member 346 may define a gap or flow passage within an interior portion of swirler 322. As illustrated in FIG. 3B, hub 342, fins 344, and annular member 346 define a gap. In other implementations, annular member 346 may be extend partially around swirler 322. Additionally or alternatively, although annular member 346 is positioned in a middle of swirler 322, annular member 346 may be positioned closer to a top or bottom of swirler 322 in other implementations.

Referring to FIG. 3C, another side view of example configuration of swirler 322 is illustrated. In FIG. 3C, second connector 348B is illustrated as a "u" shaped member which may be inserted into a rectangular notch defined by first connector 348A. As compared to the orientation of the swirler 322 in the side view illustrated in FIG. 3A, the orientation of the swirler 322 is rotated 90 degrees in the other side view of FIG. 3C. Although connectors 348A and 348B are illustrated as a tongue and groove or notch and insert, in other implementations, swirler 322 includes two grooves or notches, i.e., two connectors 348A, and a separate insert (i.e., double sided insert) is placed into corresponding grooves or notches, i.e., connectors 348A, of two swirlers 322 to couple two swirlers together.

Figures 3D, 3E, 3F:
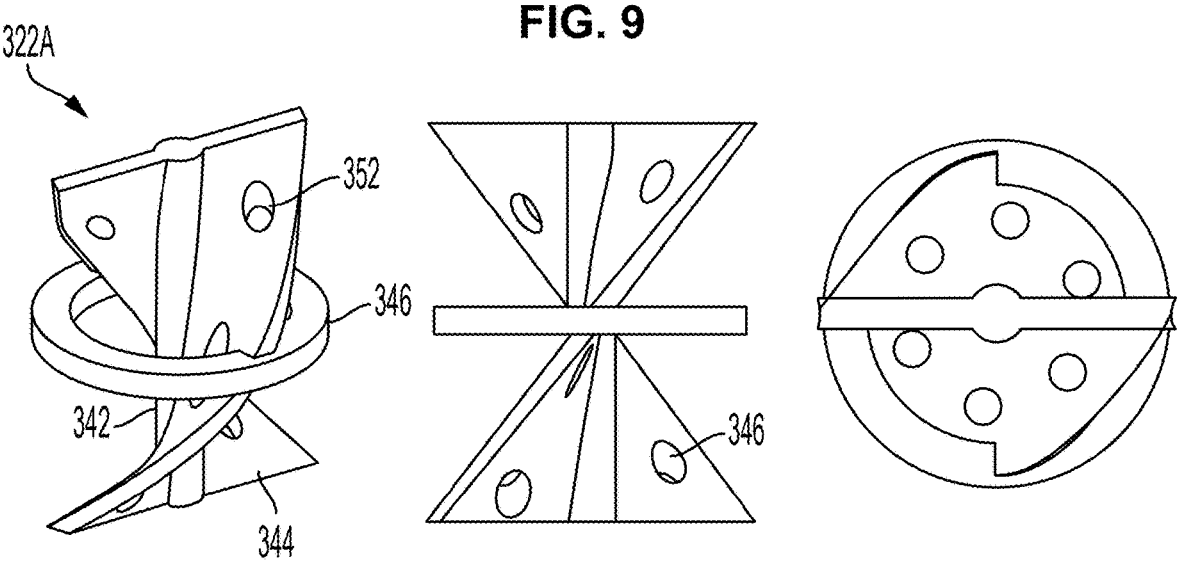
FIGS. 3D, 3E and 3F each illustrate a view of another example configuration of a swirler.

In some implementations, a swirler or one or more swirlers of a stack may define one or more apertures, as illustrated in FIGS. 3D-3F. Referring to FIGS. 3D-3F, three views of an example "mesh" swirler 322A are illustrated.

FIG. 3D illustrates an isometric view of mesh swirler 322A, FIG. 3E illustrates a side view of mesh swirler 322A, and FIG. 3F illustrates a top view of mesh swirler 322A. In FIG. 3D, mesh swirler 322A includes one or more through holes 352 in fins 344 thereof. To illustrate, surfaces of the fins 344 define through holes 352. Through holes 352 are configured to divert and/or or direct flow. Through holes 352 may act as flow paths or funnels. As illustrated in FIGS. 3D-3F, through holes 352 are arranged parallel to a flow direction and a length of mesh swirler 322A. In other implementations, one or more of through holes 352 may be angled to direct flow, such as radially outward, in a circle and lengthwise to increase vorticity, or into one another to increase turbulence. Although through holes 352 are illustrated in fins 344 of mesh swirler 322A, in other implementations, through holes 352 may be arranged or positioned on base 342 and/or ring 346 in addition to or in the alternative of through holes 352 in fins 344.

Figure 4C:
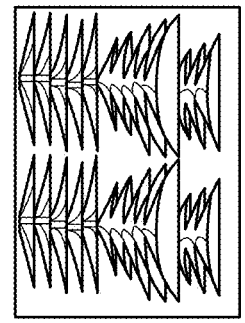
FIGS. 4C-4E each depict a surface pattern for a swirler.
Figure 4D:
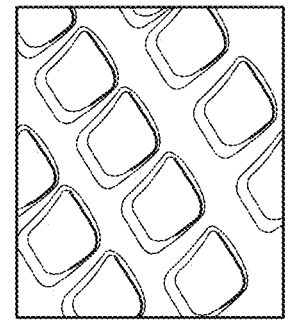
Figure 4E:
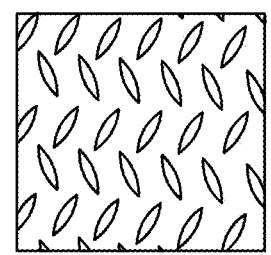
Figure 4F:
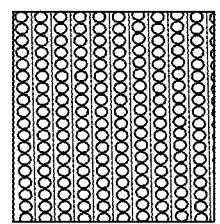
FIGS. 4F and 4G each depict a packing insert for a swirler.
Figure 4G:
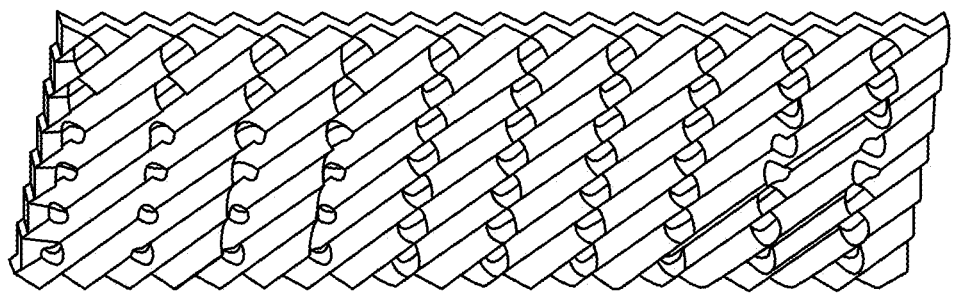
Figure 4B:
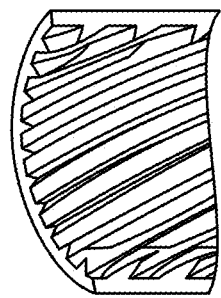
FIG. 4B is a diagram that illustrates surface features of a swirler.
Figure 4A:
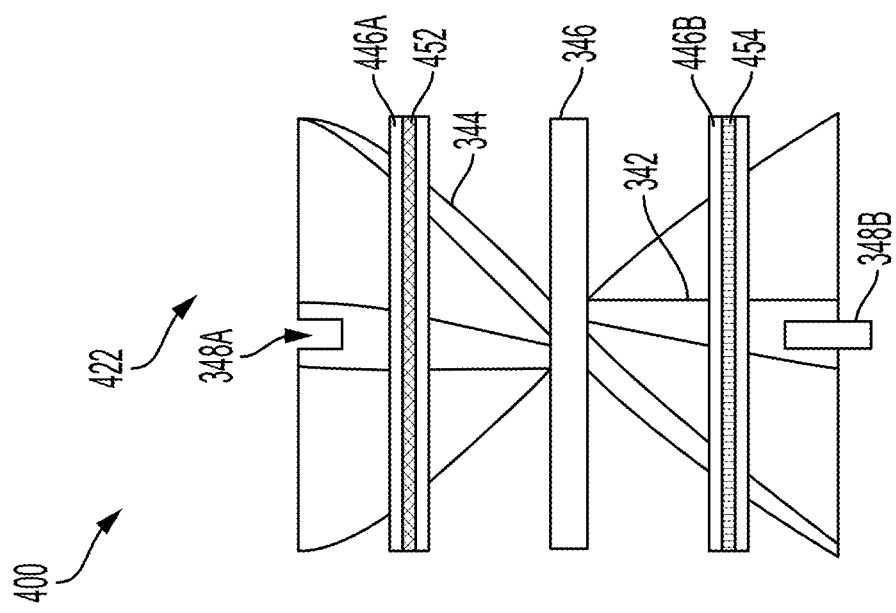
FIG. 4A is a side view of another example configuration of a swirler.

Referring to FIG. 4A, a diagram 400 illustrates a side view of another example of a swirler 422. In FIG. 4A, swirler 422 has additional annular members (e.g., ring members), i.e., second and third annular members 446A and 446B. As illustrated in FIG. 4A, second and third annular members 446A and 446B are positioned opposite annular member 346, i.e., on top of and underneath annular member 346. Second and third annular members 446A and 446B may be the same as or different from annular member 346 or each other. For example, one or more of annular members, such as annular member 346, 446A and 446B, may be coupled to mesh 452, which may be positioned within the corresponding annular member as illustrated in FIG. 4A. Additionally, or alternatively, one or more of annular members, such as annular member 346, 446A and 446B, may include striations, notches, corrugated members or surfaces, pipe distributors, or other surfaces features which direct flow and/or increase turbulence, illustratively shown as 454 in FIG. 4A. An example of corrugations is illustrated in FIG. 4B. Such additional features may increase rotational flow, turbulence, and/or direct the flow of fluid axially and radially outward, which results in higher mass transfer and adsorption, and are further described herein with reference to FIGS. 4C-4G.

Figure 5:
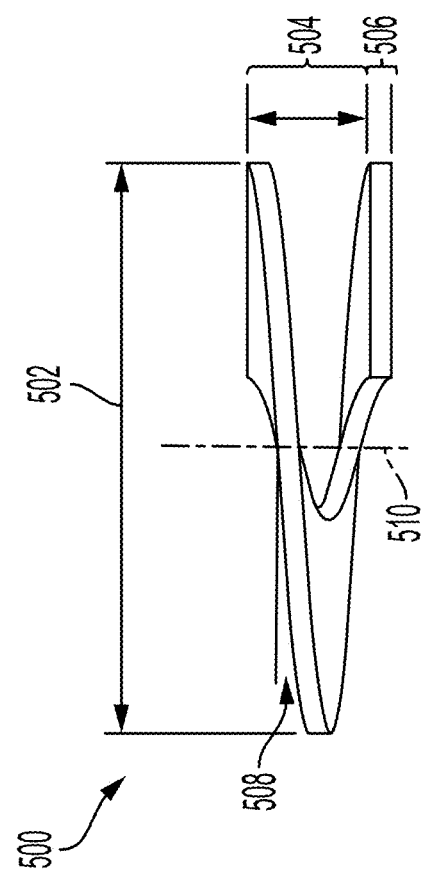
FIG. 5 is a diagram that illustrates dimension of a fin of a swirler.

Referring to FIG. 5, a diagram 500 illustrates dimension of a fin of a swirler. A fin of swirler has a diameter 502 and a pitch 504. The pitch 504 is a distance from a first top or front edge of leading edges to a second top or front edge of trailing edges. The fin has a thickness 506 as illustrated with respect to an axis 510, i.e. a longitudinal axis of a swirler or rotational axis of a swirler. The fin further has a helix angle 508, i.e., an amount of twist of the fin.

The fin further has a total amount of twist or angle over the length, pitch 504, of the fin. As an example, the fins 344 illustrated in FIG. 4A have 180 degrees of total twist over the entire fin pitch or length of swirler 422, and as illustrated in FIG. 5, the fin has 360 degrees of total twist over the entire fin pitch or length of the fin. As compared to the fin in FIG. 5, the fins 344 of FIGS. 3A-3C and 4 have leading and trailing edges which face an axially or flow direction, i.e., oriented along axis 510. The swirlers described herein may have different dimensions 502-508 based on the dimensions of the corresponding adsorption column. A swirler (i.e., one or more dimensions 502-508 thereof) may be scaled up or down to meet adsorption column parameters, such as length or width thereof. Accordingly, a single design (and a single design file) may be used to generate swirlers for multiple adsorption columns sizes and types. Some exemplary parameters for the swirlers described herein include a helix angle 508 (e.g., angle of twist) of 15 to 70 degrees and a total twist or angle over the entire pitch 504 of 90 to 1080 degrees (i.e., a swirler may have a fin make multiple rotations around the swirler).

Referring to FIGS. 6 and 7 diagrams of example configurations of stacks of swirlers are illustrated. Referring to FIG. 6, a diagram 600 illustrates an exploded isometric view of an example of a stack 602 of swirlers 622. The stack 602 of swirlers 622 may be positioned or inserted into an adsorption column, such as column 112, and the swirlers 622 may include or correspond to one or more of swirlers 122, 222, 322, or 422. In FIG. 6, a bottom of a first swirler 622A is configured to couple to a top of a second swirler 622B by corresponding interconnects, a notch and groove as illustrated. As illustrated in FIG. 6, the first swirler 622A and the second swirler 622B both have the same configuration or orientation, denoted by orientation 612 (e.g., a first orientation). The orientation 612 corresponds to an alignment of the fins of the swirlers 622, which are aligned on top and bottom, partly due to the 180 degree total twist over the pitch.

Referring to FIG. 7, a diagram 700 illustrates an exploded isometric view of an example of a stack 702 of swirlers 722. The stack 702 of swirlers 722 may be positioned or inserted into an adsorption column, such as column 112, and the swirlers 722 may include or correspond to one or more of swirlers 122, 222, 322, or 422. In FIG. 7, a bottom of a first swirler 722A is configured to couple to a top of a second swirler 722B (via connector 748B), and a bottom of the second swirler 722B is configured to couple to a top of a third swirler 722C. As illustrated in the example of FIG. 7, first and third swirlers 722A and 722C have a first orientation 712 and second swirler 722B has a different second orientation 714, and the second orientation 714 is offset from the first orientation by 90 degrees. To illustrate, the fins of a swirler having the second orientation 714 may be offset at a starting position, an ending position, or both, from a corresponding orientation or orientations of the fins of a swirler having the first orientation 712. In FIG. 7, the starting position and the ending position of the fins are offset by 90 degrees.

Although two fins are illustrated in FIGS. 6 and 7, in other implementations, the swirlers have one fin or more than two fins, such as three fins, four fins, eight fins, etc. Additionally, or alternatively, although symmetrical swirlers (e.g., swirlers having fins with radial symmetry) are illustrated in FIGS. 6 and 7, in other implementations, the swirlers may be non-symmetrical. To illustrate, the fins of a particular swirler may have different shapes or a stack may have different types of swirlers. Furthermore, although stacks of two and three swirlers are illustrated in FIGS. 6 and 7 respectively, in other implementations, a stack of swirlers may have more than 3 swirlers, such as four, five, six, eight, etc. swirlers.

An interconnected stack of swirlers may direct or distributed more fluid from a core or central portion of the adsorption column towards interior walls (i.e., radially outward) thereby enabling increased resin and/or bed utilization, as compared to a single swirler or a plurality or stack of loose swirlers (i.e., separated or non-connected swirlers). Additionally, offsetting the fins of the swirlers of the stack, as shown by the different orientations of the stack in FIG. 7, may further increase mass transfer and adsorption.

Similar to swirlers 122 of FIG. 1, one or more swirlers of a stack of swirlers may be configured to rotate. For example, one or more swirlers of a stack may rotate passively or be actively rotate. In other implementations, the swirlers of the stack are fixed and do not rotate. Additionally or alternatively, the first and second swirlers may be arranged such that they have a counterrotating arrangement. To illustrate, first fins of a first swirler rotate the fluid in the adsorption column in a first rotation direction (e.g., counter-clockwise), and second fins of a second swirler rotate the fluid in the adsorption column in a second rotation direction (e.g., clockwise). In a particular implementation, one or more swirlers of a stack may rotate in counterrotating (opposite) directions to rotate the fluid in opposite directions. Such counterrotating arrangements and/or contra-rotating swirlers (swirlers that rotate in opposite directions around the same axis) may further increase mass transfer and adsorption efficiency.

In other implementations, one or more swirlers of the stack include additional features or elements described herein, such as additional features or elements configured to increase rotational flow, turbulence, and/or direct the flow of process fluid and described with reference to FIG. 4A. For example, a swirler or swirlers of the stack may further include mesh (e.g., mesh wiring) coupled to base and ring such that the mesh is positioned within a gap defined by the ring. As another example, the base, the fins, and/or the ring may include mesh overlaid over or attached to a surface thereof, such as the mesh illustrated in FIG. 4F. In addition, a swirler or swirlers of the stack may further include striations, i.e., a series of ridge, furrows, or linear marks. As an illustrative, example, the material of the ring is corrugated, i.e., has corrugations or an alternating pattern of surface ridges and grooves.

In some implementations, other surface features may be incorporated into the base, the fins, and/or the ring of any of the swirlers described herein. For example, in addition to or in the alternative of striations or corrugations, a surface of a swirler may be embossed. To illustrate, one or more surfaces of the swirler include embossed structures or "mini protrusions." The structures and mini protrusions may differ in height from the surface by a few microns to a few millimeters, such as 50 microns to 5 millimeters.

The embossed structures and mini protrusions on the surface can be of various shapes and wave angled contours, circular spikes, elongated striations, etc. Some example patterns of embossed structures and mini protrusions are illustrated in FIGS. 4C-4E. The embossed structure and/or mini protrusion on the surface of the swirler helps increase the swirling characteristics including creating mini vortexes as well as helps in longer retention/contact with the surround resins in the packing to ultimately increase mass transfer and efficiency.

Additionally, or alternatively, one or more of the swirlers described herein may be used in conjunction without other packing materials (e.g., 126), as illustrated in FIGS. 4F and 4G. For example, a swirler or swirler stack may be used with mesh or corrugated inserts, as illustrated in FIGS. 4F and 4G. FIG. 4F illustrates a portion of a mesh covering, and FIG. 4G illustrates a corrugated insert (e.g., corrugated covering or swirler surround), generally referred to as packing inserts (e.g., 126). Such packing inserts may be positioned in an absorption column with the swirler or swirler stack to further increase mass transfer in the adsorption column. To illustrate, a swirler or swirler stack may be positioned in between two such corrugated sheets of FIG. 4G or between two mesh sheets as in FIG. 4F, arranged lengthwise in the adsorption column. In other implementations, a swirler or swirler stack may be positioned in between both corrugated sheets and mesh sheets. As illustrative examples, a swirler or swirler stack may be positioned in between a stack of sheets on two sides, or may be surrounded on four sides by alternating types of sheets (e.g., corrugated-mesh-corrugated-mesh). Although a few exemplary configurations have been illustrated above, other additional configurations are possible.

In some implementations, the mesh and/or corrugated sheets may have non-uniform features or dimensions. As illustrated in FIG. 4G, the corrugated sheet includes more holes on a first side (bottom side) than on a second side (top side). Such differences in features or dimensions may include in addition or in the alternative of amount of holes, different size holes, different hole spacing, sheet height, sheet width, sheet length, angle, of corrugations, etc.

Although stacks of multiple discreet swirlers are illustrated in FIGS. 6 and 7, in other implementations, a stack of swirlers is a monolithic structure with multiple swirlers sections or swirlers stages, referred to a multi-stage or multi-section swirler. Each stage or section may have a corresponding plurality of fins, and the fins of each stage or section may be arranged similarly to or differently from one another or have different properties. The multiple stages and/or multiple swirlers sections may further increase rotation and adsorption. In a particular implementation, the multi-stage swirler has a counterrotating orientation.

Figure 8:
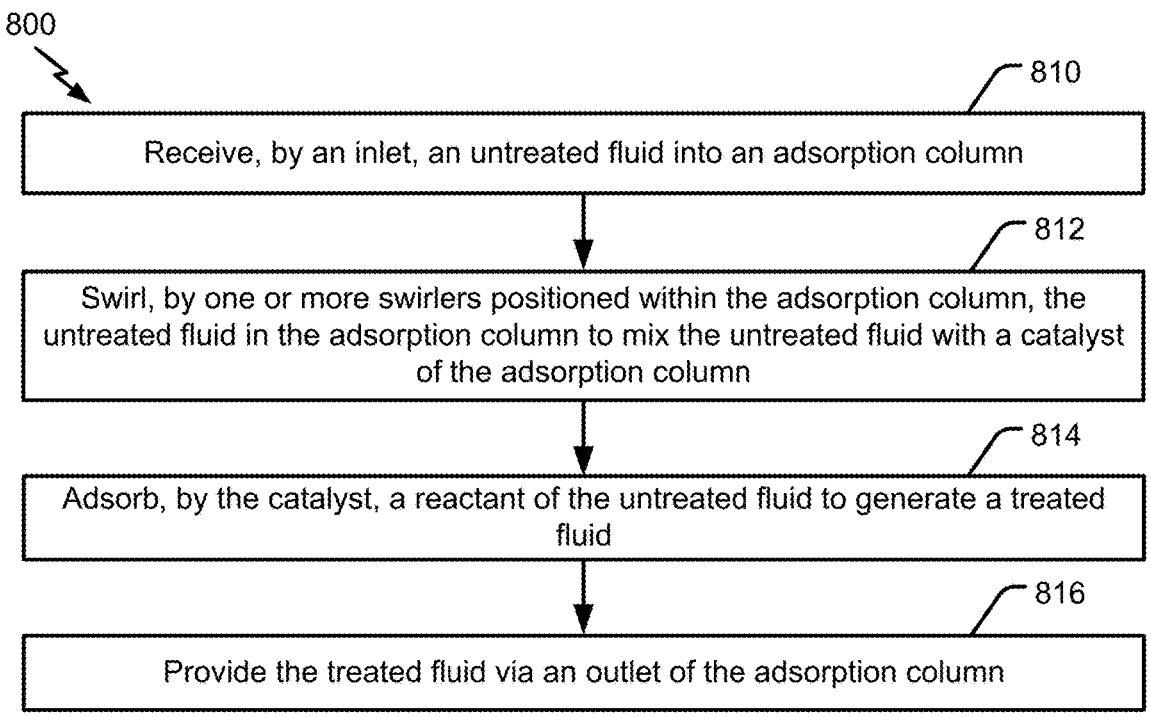
FIG. 8 is a flowchart of an example of a method of operating a swirled adsorption column.

Referring to FIG. 8, an example of a method of operating an adsorption column is shown. Method 800 may be performed by a manufacturing device or system, such as system 100 (e.g., column 112 and/or electronic device 114). The method 800 may be used to remove or separate impurities or contaminants, such as glycol, from a process fluid (aka influent).

Method 800 includes receiving, by an inlet, an untreated fluid into an adsorption column, at 810. For example, inlet may include or correspond inlet 132, and the untreated fluid may include or correspond to influent 116. Adsorption column may include or correspond to column 112, 212A, or 212B.

Method 800 also includes swirling, by one or more swirlers positioned within the adsorption column, the untreated fluid in the adsorption column to mix the untreated fluid with a catalyst of the adsorption column, at 812. For example, the one or more swirlers may include or correspond to swirlers 122, 222, 322, or 422. Method 800 includes adsorbing, by the catalyst, a reactant of the untreated fluid to generate a treated fluid, at 814. For example, the reactant may include or correspond to impurities or contaminants of influent 116, and the treated fluid may include or correspond to effluent 118.

Method 800 further includes providing the treated fluid via an outlet of the adsorption column, at 816. For example, the outlet may include or correspond to outlet 134, 234A, or 234B. Method 800 may further include regeneration of the adsorption column, recycling the treated fluid for retreatment, retreating the treated fluid in the adsorption column or a second adsorption column, or a combination thereof. Thus, method 800 describes operating a swirled adsorption column. Method 800 advantageously enables more efficient adsorption by a column 112 with reduced operating costs.

Figure 9:
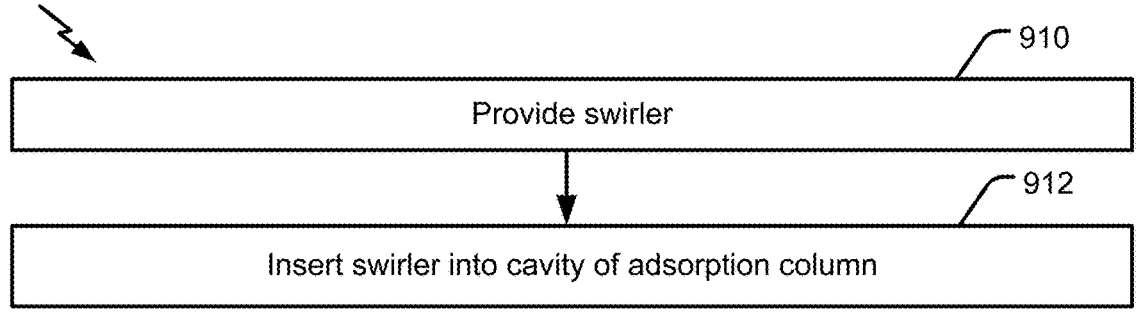
FIG. 9 is a flowchart of an example of a method of retrofitting an adsorption column to a swirled adsorption column.

Referring to FIG. 9, an example of a method of retrofitting an adsorption column is shown. Method 900 may be performed by a manufacturing device or a person. The adsorption column may include or correspond to a conventional adsorption column, as described herein. For example, the adsorption column can include conventional urea adsorption columns, conventional aldehyde adsorption columns, conventional deionization adsorption columns, and/or packed bed style adsorption columns.

Method 900 includes providing a swirler, at 910. For example, the swirler (aka mass transfer swirler) may include or correspond to swirler 122, swirler 222, swirler 322, or stack of swirlers 422. Method 900 also includes installing the swirler in a cavity of an adsorption column, at 912. For example, a swirler is positioned in cavity of or defined by bed 130 of column 112. To illustrate, a swirler is positioned axially in adsorption column and may optionally be coupled to other swirlers. In a particular implementation, the swirler is coupled to a drive shaft of a motor and is rotated actively by the motor.

Method 900 may further include partially removing, removing, partially disassembling, or disassembling the adsorption column to access the cavity. For example, the adsorption column may be uncoupled from the system (e.g., deionizer), the distributor may be uncoupled from the walls of the adsorption column, etc., to expose the cavity. Thus, method 900 describes retrofitting an adsorption column to convert a conventional adsorption column to a swirled adsorption column, such as column 112, having increased efficiency. Method 900 advantageously enables the retrofitting of current adsorption columns with a component to achieve higher efficiency and reduced costs. Examples of adsorption columns and/or systems which may be retrofitted include glycol and oxygenates units (e.g., ethylene glycol removal, such as MEG, DEG, and TEG removal), carbon dioxide adsorbers/strippers, ethylene oxide adsorbers/strippers, deionizing units (e.g., ion exchange resin based deionizing units), aldehyde removal units (e.g., aldehyde removal units using reactive, catalytic, and/or ion exchange resins), urea adsorption units, regeneration units, and other adsorption, chromatography, or distillation units having a homogenous phase adsorption or separation process.

It is noted that one or more operations described with reference to one of the methods of FIGS. 8 and 9 may be combined with one or more operations of another of FIGS. 8 and 9. For example, one or more operations of method 800 may be combined with one or more operations of method 900. Additionally, one or more of the operations described with reference to the systems of FIG. 1 and FIG. 2 may be combined with one or more operations described with reference to one of the methods of FIGS. 8 and 9.

EXPERIMENTAL RESULTS

Experimental Analysis of the exemplary swirlers and swirled adsorption columns was performed using activated carbon (charcoal) as the adsorbent material for adsorption of Urea and resin for the adsorption of aldehyde. In the experiments, Batch Adsorption and multiple types of Column Adsorption were evaluated.

For the Batch Adsorption in a Batch condition, a conical flask was charged with dialysate buffer and loaded with 10 weight percent (wt %) activated carbon. The filled conical flask was put on a shaker at 150 rpm at room temperature. After 24 hours, an aliquot was taken from the solution of the conical flask, the aliquot was filtered, and was sent for urea content analysis.

For the Column Adsorption in an Adsorption Column, a cylindrical glass column was packed with activated carbon while maintaining length to diameter (L/D) ratio of 5 in all cases. The packed column was wetted with distilled water for 24 hours before carrying out the urea adsorption experiments. Dialysate fluid composition having urea concentration of 2000 parts per million (ppm) was poured from a top of the packed column and passed through the packed column while applying a constant vacuum of 0.08 MPa at a bottom of the packed column. The flow rate was observed as 1.5 ml/minute under employed experimental conditions. Aliquots were collected at different time intervals over the period of 90 to 180 minutes and urea concentration was estimated. Three configurations were tested for the Column Adsorption and the results are illustrated in Table 1 below. The three configurations include swirlers without rings, swirlers with rings and interconnected to one another, and swirlers with rings and separated. Separated rings were spaced from each other about 20 to 75 percent of the height of each swirler.

TABLE 1

| Time (minutes) | Without Rings Concentration (ppm) | With Rings and Interconnected Concentration (ppm) | With Rings and Separated Concentration (ppm) |
|---|---|---|---|
| 0 | 2077.12 | 2069.26 | 2019 |
| 5 | 0 | 0 | 0 |
| 15 | 0 | 0 | 0 |
| 30 | 209.58 | 413.342 | 0 |
| 45 | 533.76 | 650.552 | 0 |
| 60 | 905.299 | 855.924 | 0 |
| 75 | 1275.52 | 1353.895 | 0 |
| 90 | 1335.995 | 1545.05 | 0 |
| 120 | N/A | N/A | 336 |
| 150 | N/A | N/A | 1577 |
| 180 | N/A | N/A | 1776 |

Figure 10:
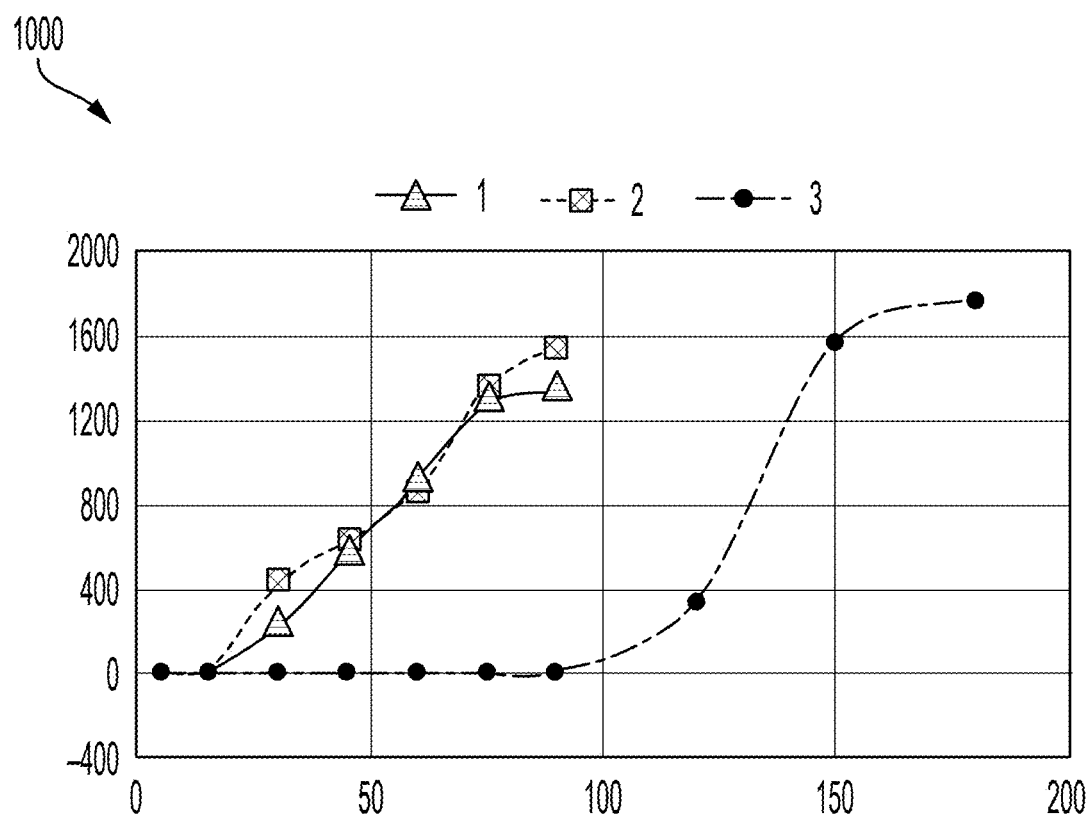
FIG. 10 is a diagram illustrating breakthrough curves for swirled adsorption columns.

Referring to FIG. 10, breakthrough curves for the results of the experiments and illustrating the values of Table 1 are illustrated. In FIG. 10, the breakthrough curves for each Column Adsorption configuration are illustrated in Graph 1000. Graph 1000 illustrates urea concentration in ppm (vertical axis) against time in minutes (horizontal axis) for three configurations, i.e., 1) Without Rings; 2) With Rings and Interconnected; and 3) With Rings and Separated. A breakthrough curve illustrates the concentration of urea over time. A time until some adsorbate leaves the column as effluent (column effluent), is referred to as breakthrough time and illustrated as the time when the Urea concentration increases from zero. A longer breakthrough time is desired as it is generally not desired for adsorbate (i.e., particles adsorbed on the adsorbent material, here activated carbon) to break free from the adsorbent material and leave the column with the effluent. The Trapezoidal Rule was applied for calculating the AUC (Area under the Curve) for the breakthrough curves of FIG. 10. Normalized methods of differences was employed to project the break-through curve till breakthrough point to calculate overall g/kg (Adsorption Capacity) of adsorbent for all sets of experiments presented in Table 1.

Table 2 illustrated below depicts urea adsorption capacity of the adsorbent material, here activated carbon for the different configurations. As illustrated in Table 2, the batch configuration or control configuration produced a urea adsorption capacity of 6.44 g/kg, i.e., 6.44 grams of urea can be absorbed per kilogram of activated carbon. The Column Adsorption configurations produced much higher urea adsorption capacities, with 21 g/kg when using swirlers and greater than 33 g/kg when using ring members with gaps. The most efficient observed result (i.e., swirler flow inserts with intermediate adsorbent packing) produced an adsorption capacity of 64.36 g/kg until the experimental time of 180 minutes.

TABLE 2

| Style No. | Adsorption Process | Urea Adsorption Capacity (g/kg) |
|---|---|---|
| 1 | Batch | 6.44 |
| 2 | Swirled Column | 21 |
| 3 | Swirled Column with Ring Gaps | >33.7 |

Figure 11A:
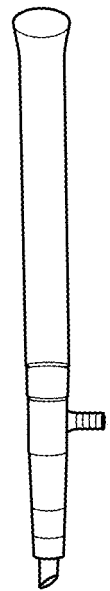
FIGS. 11A, 11B, and 11C are each a diagram illustrating components of the swirled adsorption columns of FIG. 10.
Figure 11B:
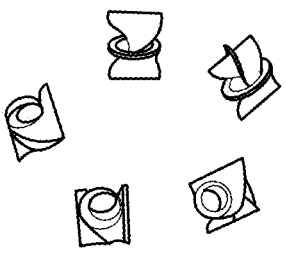
Figure 11C:
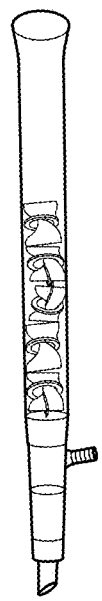

Table 3 below illustrates results of aldehyde adsorption experiments and aldehyde removal efficiency for commercially used columns. In Table 3, a conventional adsorption column including a packing configuration of a random packed bed of Purolite, a registered trademark of Purolite Corporation, C-160 resin was evaluated using a feed aldehyde concentration of 400 ppm for 30 minutes. The same adsorption column with swirlers was also evaluated using the same conditions, a feed aldehyde concentration of 400 ppm for 30 minutes. After the 30 minutes, the swirler configuration produced a 29 percent increase in aldehyde removal efficiency as compared to the conventional column. Illustrative examples of the adsorption column, the swirlers, and a configuration of a stack of separated swirlers without rings used in the above described experiments are illustrated in FIGS. 11A, 11B, and 11C.

TABLE 3

| | Without Swirlers | With Swirlers |
|---|---|---|
| Feed Aldehyde Concentration (ppm) | 400 | 400 |
| Time (min) | 30 | 30 |
| Concentration (ppm) | 274.6 | 158.3 |
| Aldehyde removal efficiency | 31.35% | 60.43% |

Additional experiments were performed and the swirlers exhibited similar results to Table 3 above. For example, in other experiments other compounds (e.g., acetic acid, formic acid, glycolic acid, etc.) were used and/or other settings were used and the swirler variants exhibited a 60 to 75 percent total removal efficiency, about two times the efficiency of the non-swirler variants, increased adsorption capacity, and had lower outlet concentrations. In some of the additional experiments, one or more of the following parameters were used, column dimensions of 600 mm (L) by 200 mm (ID), packing dimensions of 300 mm (L) by 200 mm (ID), packing L/D ration of about 1-1.5, resin volumes of about 0.008 m$^3$, feed concentrations as high as 700 ppm, or particles sizes of about 0.3-1.2 mm. Additionally, screen type distributors were used in some experiments. Different resins and regenerants were also used, such as, Amberlyst A-21 and ARR-1 wet bisulfite, and sodium hydroxide (e.g., 20 wt %) and sodium bisulfite (e.g., 25 wt %), respectively.

Illustrative examples of some such additional experiments are provided below in Tables 4-7. Table 4 illustrates parameters of the column for some such experiments. Table 5 illustrates additional parameters of the column and parameters for the resin for some such experiments. Experimental runs were performed using a feed including Acetic Acid, Formic acid, and Glycolic acid and using a feeding including aldehydes to mimic cycle water feed concentration of a treatment plant. Anionic and Aldehyde Removal Resin was employed with a L/D ratio of about 2:1. A feed flow rate of 4-8 bed volumes/hour was maintained.

Results of particular experimental runs for normalized Acetic Acid and normalized Formaldehyde are illustrated in Tables 6 and 7 respectively. In Table 6, the acids are normalized and quantified in terms of acetic acid; and in Table 7, the aldehydes are normalized and quantified in terms of formaldehyde. The acids include acetic acid, formic acid, and glycolic acid. The aldehydes include glycolaldehyde, formaldehyde, acetaldehyde, acrolein, acetone, propanal, crotonaldehyden-C5, iso-C5, C6 aldehydes. In Tables 6 and 7, cumulative outlet concentration values correspond to the concentration of the overall processed solution through the column in total experimental time until breakthrough was achieved.

TABLE 4

| Parameter | Value |
| --- | --- |
| LHSV (1/hr) | 5.85-6 |
| L/D ratio of packing | 1-1.5 |
| Resin Volume ($m^3$) | 0.0075-0.008 $m^3$ |

TABLE 5

Column and Resin Details/Properties

| Parameter | Anion Removal Resin | Aldehyde Removal Resin | Cationic Removal Resin |
| --- | --- | --- | --- |
| Impurity (Nonnalized Quantification) | Acetic Acid | Formaldehyde | Sodium Acetate |
| Column Dimensions (vessel Length (L), Inner Diameter (ID)) | 600 mm (L), 200 mm (ID) | 600 mm (L), 200 mm (ID) | 600 mm (L), 200 mm (ID) |
| Packing Dimensions (L, ID) | 300 mm (L), 200 mm (ID) | 300 mm (L), 200 mm (ID) | 300 mm (L), 200 mm (ID) |
| Resin Name | Amberlyst A-21 | ARR-1 wet bisulfite | Amberlyst 15 |
| Resin Volume ($m^3$) | 0.0075 ($m^3$) | 0.008 ($m^3$) | 0.008 ($m^3$) |
| Distributor Type | Johnson Screen type | Johnson Screen type | Johnson Screen type |
| Particle Size (mm) | 0.4-1.19 mm | 0.3-1.2 mm | 20-50 mesh (0.297-0.841 mm) |
| Regenerant | 20 wt % NaOH | 25 wt % $NaHSO_3$ | Conc. HCl |

TABLE 6

| Parameter | Without Swirlers | With Swirlers |
| --- | --- | --- |
| Feed Acid Concentration (ppm) | 500 | 500 |
| Breakthrough Time (min) | 474 | 258 |
| Cumulative Outlet Concentration (ppm) | 121.2 | 264.5 |
| Acid Removal Efficiency (%) | 47.21% | 75.76% |

TABLE 7

| Parameter | Without Swirlers | With Swirlers |
| --- | --- | --- |
| Feed Aldehyde Concentration (ppm) | 700 | 700 |
| Breakthrough Time (min) | 768 | 398 |
| Cumulative Outlet Concentration (ppm) | 498.6 | 273.2 |
| Aldehyde Removal Efficiency (%) | 28.77% | 60.97% |

TABLE 8

| Parameter | Without Swirlers | With Swirlers |
| --- | --- | --- |
| Feed Sodium Acetate Concentration (ppm) | 750 | 750 |
| Breakthrough Time (min) | 421 | 823 |
| Cumulative Outlet Concentration (ppm) | 522.7 | 285.9 |
| Aldehyde Removal Efficiency (%) | 30.3% | 61.88% |

Accordingly, swirlers (all configurations) produce increased adsorption efficiency across all conditions and for multiple different adsorption reactions as compared to conventional adsorption columns and methods. Thus, adding swirlers to all types of adsorption columns will increase adsorption efficiency as the swirlers increase mass transfer and thus, increase adsorption efficiency.

The above specification and examples provide a complete description of the structure and use of illustrative implementations. Although certain implementations have been described above with a certain degree of particularity, or with reference to one or more individual implementations, those skilled in the art could make numerous alterations to the disclosed implementations without departing from the scope of this disclosure. As such, the various illustrative implementations of the methods and systems are not intended to be limited to the particular forms disclosed. Rather, they include all modifications and alternatives falling within the scope of the claims, and implementations other than the one shown may include some or all of the features of the depicted implementations. For example, elements may be omitted or combined as a unitary structure, connections may be substituted, or both. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one implementation or may relate to several implementations. Accordingly, no single implementation described herein should be construed as limiting and implementations of the disclosure may be suitably combined without departing from the teachings of the disclosure.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A swirler comprising:
   a base comprising a first end opposite a second end along a longitudinal axis of the base, the base including one or more fins oriented along the longitudinal axis from the first end to the second end; and
   an annular member coupled to the base and/or the one or more fins, the annular member forming at least a portion of a ring or at least a portion of a cylinder having the longitudinal axis of the base as the axis of the ring or cylinder, the annular member extending partially along a longitudinal length of one of the one or more fins and at least at a midpoint of an entire longitudinal length of the swirler.

2. The swirler of claim 1, wherein the base, fins or both, comprise plastic or metal.

3. The swirler of claim 1, wherein a degree of twist with respect to a longitudinal axis of the base is between 15 to 70 degrees.

4. The swirler of claim 1, wherein the annular member includes striations or has a corrugated surface.

5. The swirler of claim 1, further comprising one or more interconnects configured to couple to one or more other swirlers.

6. The swirler of claim 1, wherein the base comprises a hub, and wherein the one or more fins comprises two helical fins coupled to the hub, the two helical fins each having a rectangular cross section and a pitch of 150-210 degrees about the longitudinal axis.

7. A system comprising: a cylindrical tube; a distributor coupled to the cylindrical tube configured to provide fluid to the cylindrical tube; a catalyst positioned in the cylindrical tube; a plurality of swirlers according to claim 1 positioned in the cylindrical tube, wherein the plurality swirlers are configured to increase a vorticity of the fluid in the cylindrical tube and to direct the fluid to interior walls of the cylindrical tube to enable adsorption of a reactant in the fluid by the catalyst to generate treated fluid; and an outlet configured to provide the treated fluid from the cylindrical tube.

8. The system of claim 7, wherein the system comprises an adsorption column including the cylindrical tube, the distributor, the catalyst, and the plurality of swirlers, wherein the catalyst comprises resins, adsorbent beds, packed particles, coated particles, or a combination thereof, and wherein the plurality of swirlers include an annular member, a distribution plate, or a pipe distributor.

9. The system of claim 8, further comprising a second adsorption column, the second adsorption column different from the adsorption column and including a second inlet coupled to an outlet of the adsorption column.

10. The system of claim 7, wherein the system comprises a deionizing unit, and wherein the catalyst comprises an ion exchange resin.

11. The system of claim 7, wherein the system comprises an aldehyde removal unit, and wherein the catalyst comprises activated carbon.

12. The system of claim 7, wherein each swirler of the plurality of swirlers comprises: a first coupling configuration at a first end of the swirler; and a second coupling configuration at a second end of the swirler, wherein a particular first coupling configuration of a first swirler of the plurality of swirlers is configured to mate with a second particular coupling configuration of a second swirler of the plurality of swirlers.

13. The system of claim 7, further comprising a collector coupled to the cylindrical tube and configured to receive treated fluid from the cylindrical tube; a bed positioned in the cylindrical tube and including the plurality of swirlers; and one or more reclaim compressors coupled to the cylindrical tube.

14. A method of operating an adsorption column, the method comprising the steps of: receiving, by an inlet, an untreated fluid into an adsorption column; swirling, by one or more swirlers of claim 1, the one or more swirlers positioned within the adsorption column, the untreated fluid in the adsorption column to mix the untreated fluid with a catalyst of the adsorption column; adsorbing, by the catalyst, a reactant of the untreated fluid to generate a treated fluid; and providing the treated fluid via an outlet of the adsorption column.

15. The method of claim 14, wherein the treated fluid comprises partially treated fluid, and further comprising providing the treated fluid to a second inlet of a second adsorption column, the second adsorption column configured to generate a second treated fluid.

16. The method of claim 14, wherein the reactant comprises impurities in the untreated fluid, and further comprising regenerating the catalyst, wherein regenerating the catalyst includes: cease providing the untreated fluid to the inlet; providing a solvent configured to remove absorbed impurities from the catalyst to regenerate the catalyst; flushing the removed impurities from adsorption column; and initiate providing the untreated fluid to the inlet.

17. The method of claim 14, further comprising rotating, by a motor coupled to the one or more swirlers, the one or more swirlers.

18. The method of claim 14, wherein swirling the untreated fluid causes the untreated fluid to generate localized vortices resulting in increased turbulence.

19. A swirler comprising:
   a base comprising a first end opposite a second end along a longitudinal axis of the base, the base including one or more fins oriented along the longitudinal axis from the first end to the second end; and an annular member coupled to the fins and/or the base, the annular member forming a ring or a cylinder having the longitudinal axis of the base as the axis of the ring or cylinder, further comprising mesh coupled to the base, the annular member or both, wherein the mesh is positioned within a gap defined by the base and the annular member.

20. The swirler of claim 19, wherein the annular member forms a cylinder extending along an entire longitudinal length of one of the one or more fins.

* * * * *